US008713808B2

(12) United States Patent  (10) Patent No.: US 8,713,808 B2
Amron  (45) Date of Patent: May 6, 2014

(54) SYSTEM AND METHOD FOR PROJECTING A VISIBLE LINE ON AN ATHLETIC FIELD SURFACE

(76) Inventor: Alan Amron, Ft Lauderdale, FL (US)

( * ) Notice: Subject to any disclaimer, the term of this patent is extended or adjusted under 35 U.S.C. 154(b) by 0 days.

(21) Appl. No.: 12/927,838

(22) Filed: Nov. 27, 2010

(65) Prior Publication Data

US 2011/0130228 A1    Jun. 2, 2011

Related U.S. Application Data

(60) Provisional application No. 61/265,224, filed on Nov. 30, 2009.

(51) Int. Cl.
     *G01C 15/06*      (2006.01)
(52) U.S. Cl.
     USPC ........................................... 33/289; 473/490
(58) Field of Classification Search
     USPC .................... 33/289, 290, 227, 286, DIG. 21
     See application file for complete search history.

(56) References Cited

U.S. PATENT DOCUMENTS

| 3,300,861 | A | 1/1967 | Lily |
| 3,741,662 | A | 6/1973 | Pioch |
| 3,752,588 | A | 8/1973 | Chapman |
| 4,090,708 | A | 5/1978 | McPeak |
| 4,710,819 | A | 12/1987 | Brown |
| 4,818,049 | A | 4/1989 | Assenheim et al. |
| 5,976,039 | A | 11/1999 | Epel et al. |
| 6,688,755 | B2 | 2/2004 | O'Meara |
| 6,751,880 | B1 * | 6/2004 | Amron et al. .................. 33/289 |
| 6,778,283 | B2 * | 8/2004 | Lee et al. ........................ 33/289 |
| 6,796,041 | B2 * | 9/2004 | Amron et al. ................... 33/289 |
| 6,851,198 | B1 * | 2/2005 | Harty .............................. 33/289 |
| 6,895,677 | B2 | 5/2005 | Dinicola |
| 6,907,840 | B1 * | 6/2005 | Gaines ............................ 33/289 |
| 6,976,928 | B2 * | 12/2005 | Hemphill ........................ 33/289 |
| 7,185,439 | B1 * | 3/2007 | Nubin et al. .................... 33/289 |
| 7,219,438 | B2 * | 5/2007 | Amron et al. ................... 33/289 |
| 7,434,322 | B2 * | 10/2008 | Walser et al. ................... 33/286 |
| 7,797,846 | B2 * | 9/2010 | Walser ............................ 33/290 |
| 2002/0151385 | A1 | 10/2002 | Hemphill |
| 2002/0178596 | A1 | 12/2002 | Malard et al. |
| 2004/0111903 | A1 * | 6/2004 | Amron ........................... 33/289 |
| 2004/0111904 | A1 * | 6/2004 | Amron et al. ................... 33/289 |
| 2004/0111905 | A1 * | 6/2004 | Amron et al. ................... 33/289 |
| 2011/0130228 | A1 * | 6/2011 | Amron .......................... 473/490 |

* cited by examiner

*Primary Examiner* — Yaritza Guadalupe-McCall

(74) *Attorney, Agent, or Firm* — Dinicola & Young PC; Brian K Dinicola

(57) ABSTRACT

A temporary line projection system designed to be grasped by hand and moved, by a single human operator, into a desired location as, for example, along the sidelines of a football field adjacent to where a first down line is to be projected. The system comprises a movable structure that is dimensioned and arranged to be supported by and project upwardly from an athletic field surface. A laser source is supported by the movable structure and is maintained by the movable structure at an elevated location relative to the athletic field surface. This allows the laser source to direct optical energy downward upon the field while the movable structure is maintained substantially in a first orientation relative to the athletic field surface. A sensing arrangement is operative to determine when the movable structure is no longer maintained substantially in the first orientation and a switch is operative to disable the laser source when the movable structure is no longer maintained substantially in the first orientation.

13 Claims, 3 Drawing Sheets

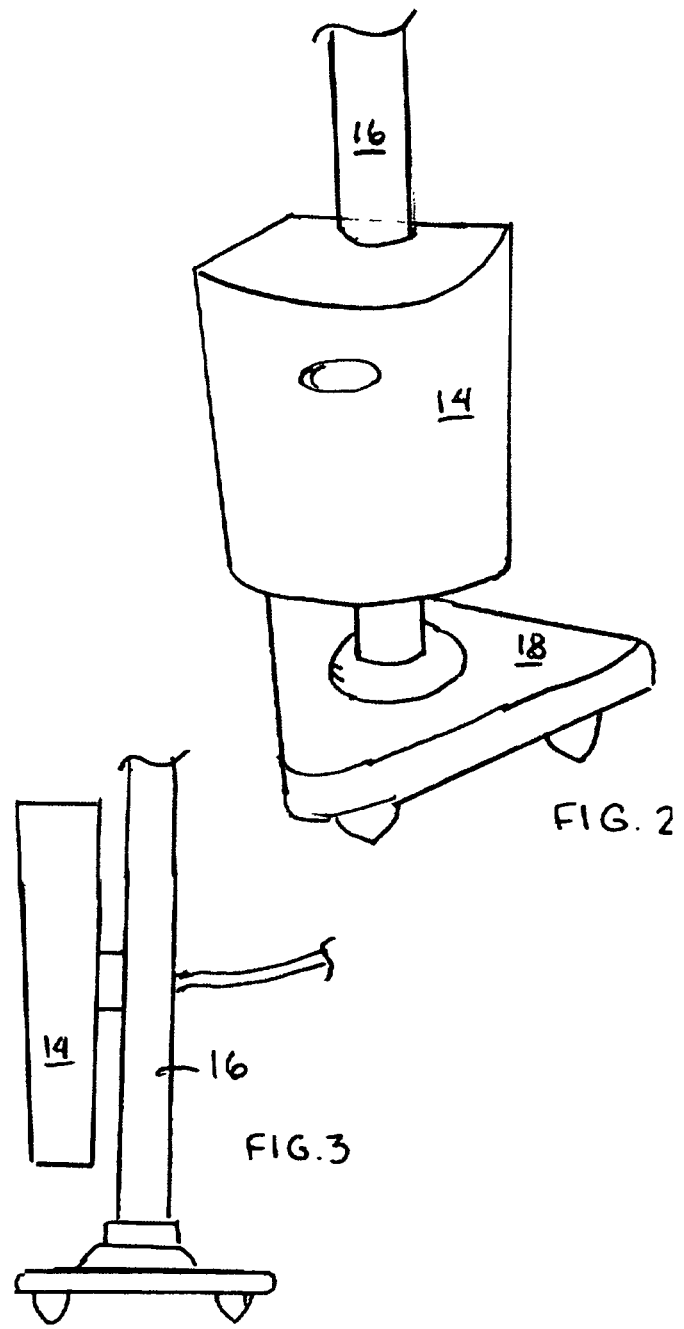

SYSTEM AND METHOD FOR PROJECTING A VISIBLE LINE ON AN ATHLETIC FIELD SURFACE

REFERENCE TO RELATED APPLICATIONS

This application claims the benefit of U.S. Provisional Application No. 61/265,224, filed Nov. 30, 2009 by Alan Amron and entitled First Down Laser System, the entire contents of which are herein incorporated by reference.

BACKGROUND OF THE INVENTION

1. Field of the Invention

The present invention relates generally the projection of visible lines onto surfaces upon which persons may be standing (e.g., athletic fields during sporting or entertainment events) and, more particularly, to systems employing laser light beam sources to generate such visible lines.

2. Description of the Related Art

In the game of football, a key objective of the team in possession of the ball (i.e., the "offense") is to retain possession of that ball by moving it far enough down the field. Specifically, the offense is given a set of four plays or "downs" to advance the ball by at least ten yards. Each time that distance is reached or exceeded, the offense is said to have crossed a "first down" line, a new set of downs is earned, and the offense is allowed to continue its advance toward the goal line of the opposing team (i.e., the "defense"). If the offense falls short, however, possession is lost and the two teams reverse their roles. A regulation football field has a length of 100 yards and 53 yards. Thus, by way of example, a team gaining possession of the ball at its own 20 yard line must move the ball a total of eighty yards in order to reach the end zone of the opposing team.

In numerous occasions throughout an average football game, the officials of the game must resort to sideline markers to establish whether the offense has advanced the ball by the required distance. The standard alignment system that is utilized is generally a pair of poles connected by a 30 foot long chain. The relative position of the football is measured by locating a first of these poles at the approximate location of the initial line of scrimmage and moving the second as far forward as possible. Each time this measurement is made, the game must be delayed and the yard markers must be carried from the sidelines to the place on the field where the official has "spotted" the ball. Although the game of football has become a relatively complex sport, involving literally hundreds of millions of invested dollars, this time consuming system has remained relatively the same since the conception of the sport.

A number of approaches intended to ameliorate the aforementioned deficiencies have been proposed over the years. Examples of such approaches are set forth in U.S. Pat. No. 3,741,662, entitled "VISIBLE LINE MARKER" and issued to Pioch on Jun. 26, 1973, in U.S. Pat. No. 3,752,588, entitled "LASER FOOTBALL FIRST DOWN MEASURING DEVICE" and issued to Chapman on Aug. 14, 1973, and in U.S. Pat. No. 4,090,708 entitled "APPARATUS FOR MARKING FOOTBALL FIELDS" and issued to McPeak on May 23, 1978. Each of the aforementioned approaches involve the use of lasers for the purpose of marking visible lines of demarcation on an athletic field. One of the principal drawbacks of these systems is the time-consuming and tedious method of operation.

Both Chapman and Pioch involve the use of track mounted, sliding projectors that are located at the sidelines and several feet above the field level. The lasers are mounted for oscillation in a vertical plane and the projected, low intensity beam developed by each must strike the field at points of reference lying on an imaginary line of demarcation defined by the intersection of the vertical plane with the field surface. Like Pioch and Chapman, McPeak discloses the use of laser assemblies adapted to accommodate sliding movement along the sidelines of a football field. Peak, however, teaches that two oppositely directed beams should be aimed at a level above (i.e., "adjacent and parallel to") the field surface. A key drawback associated with the aforementioned systems is that the low-intensity output of the lasers used is far too low to be visible by the players in ambient daylight conditions, let alone by spectators in a stadium.

Television networks have recently implemented an image pre-processing system which allows viewers of televised football games to see a so-called "virtual" first down line that digitally projects, in real time, a visible line onto video frames recorded by the television camera, the line being displayed on a viewer's television set so that it appears to extend between the first down sideline markers. Unfortunately, neither the players, game officials, nor the fans attending such games can actually see this virtual line.

The inventor herein has previously proposed several different systems and methods for projecting a visible reference light onto an athletic field. These systems are described in U.S. Pat. No. 7,219,438 filed on May 3, 2004 and entitled "SYSTEM FOR OPERATING ONE OR MORE LASERS TO PROJECT A VISIBLE LINE ONTO A SURFACE", U.S. Pat. No. 6,796,041 filed on Mar. 10, 2003 and entitled "SYSTEM FOR OPERATING ONE OR MORE SYNCHRONIZED LASERS TO PROJECT A VISIBLE LINE ONTO A SURFACE", and U.S. Pat. No. 6,751,880 filed on Mar. 10, 2003 and entitled "SYSTEM AND METHOD FOR OPERATING GROUPS OF LASERS TO PROJECT A VISIBLE LINE OF DEMARCATION ONTO DISCRETE REGIONS OF AN ATHLETIC FIELD", as well as U.S. patent application Ser. No. 10/320,304 filed on Dec. 16, 2002 and entitled "SYSTEM AND METHOD FOR DYNAMICALLY MARKING ATHLETIC FIELDS USING A HANDHELD USER INTERFACE", all of which are expressly incorporated herein by reference in their entirety.

The aforementioned laser projection systems, while functional for the intended purpose, require customized installation and are somewhat complex and expensive to operate and maintain. A continuing need exists therefore exists for a system which is capable not only of projecting a line which can be seen from different perspectives and from considerable distances—even in daylight condition, but also of doing so in a manner that is safe, relatively simple and inexpensive to install and maintain.

A need also exists for a system that is capable of projecting a line which, though intense enough to be seen from a wide range of viewing angles, conforms to all applicable eye-safety regulations such as those promulgated by the FDA's Center for Diagnostic and Radiological Health (CDRH).

SUMMARY OF THE INVENTION

The aforementioned needs are addressed, and an advance is made in the art, by a gyroscopically stabilized apparatus that is selectively movable along a first sideline of an athletic field and dimensioned and arranged to project at least one temporary, visible reference line across the athletic field surface. A system constructed in accordance with the teachings of the present invention comprises a movable structure that is dimensioned and arranged to be supported by and project upwardly from an athletic field surface. The system further includes a laser source supported by the movable structure, the laser source being maintained by the movable structure at an elevated location relative to the athletic field surface. This allows the laser source to direct optical energy downward upon the field while the movable structure is maintained substantially in a first orientation relative to the athletic field surface. The entire system is designed to be grasped by hand and moved, by a single human operator, into a desired location as, for example, along the sidelines of a football field adjacent to where a first down line is to be projected.

The illustrative embodiment of the invention further includes a safety system that includes a sensing arrangement operative to determine when the movable structure is no longer maintained substantially in the first orientation and a switch operative to disable the laser source when the movable structure is no longer maintained substantially in the first orientation. The laser source may consist of a laser, power source, and associated optical output shaping elements all supported by and movable as a unitary whole with the movable structure. Alternatively, the system may utilize a remotely located laser optically coupled to a projection module disposed within a housing supported by the movable structure. The latter configuration is deemed by the inventor herein to be more advantageous since the need for a heavy storage battery and self-contained laser cooling system is avoided, leading to a substantially lighter weight system more easily moved by the operator.

In accordance with a first illustrative embodiment of the invention, the movable structure is a free standing structure that includes a tripod base or other ground engaging structure dimensioned and arranged to maintain an upwardly extending section in a substantially vertical orientation. In accordance with a second illustrative embodiment of the invention, the movable structure has an upwardly extending section having a hand graspable portion dimensioned and arranged to be grasped by a human operator and a ground contacting base portion. A system constructed in accordance with either embodiment may further include an active or passive position stabilization system operative to maintain the laser source (or the projecting element thereof) in a substantially fixed angular orientation relative to a vertical axis extending from the field surface, despite small movements of the movable structure.

As will be readily appreciated by those skilled in the art, "active" systems are ones that utilize DC power, sensors, electronics and motors attached to gimbal rings to correct a "base" motion from affecting the laser source, while passive systems are purely mechanical and rely on the "balanced beam" phenomena. The 'beam' will resist a "base" motion from affecting the laser source positioned at the end of it because of the inherent inertia of the balanced beam. Examples of analogous active systems used to stabilize cameras include the Nettmann System's Gyron F.S. and the Geo Film's Libra Head, while analogous passive systems include the Tyler Middle and Major Mount, Advanced Camera Gyromaster and Steadicam.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 2 is a side elevation view of the exemplary line projection system of FIG. 1;

FIG. 3 is a partial perspective view of exemplary line projection of FIG. 1.

DETAILED DESCRIPTION OF EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "laser source" is intended to refer both to arrangements in which a coherent laser beam source and beam projecting optics are integrated into a single housing at a common mounting location and to arrangements in which the laser source itself consists of optical beam collimating, diffusing and/or scanning elements configured to receive, via a waveguide (e.g., optical fiber), the output of a remotely located laser source. The term "laser sources" should also be understood to encompass other line forming arrangements besides those which rely upon beam diffusing elements such as lenses, including for example, the movement of mirrors to implement a "scanning" operation.

It should also be understood that although the exemplary embodiments illustrated and described herein relate specifically to the projection of a visible straight line onto the grass surface of a football field, the teachings of the present invention are equally applicable to the projection of other types of lines—including images, logos, advertising messages, and the like—onto any surface covered by real or artificial turf.

Figure 1:
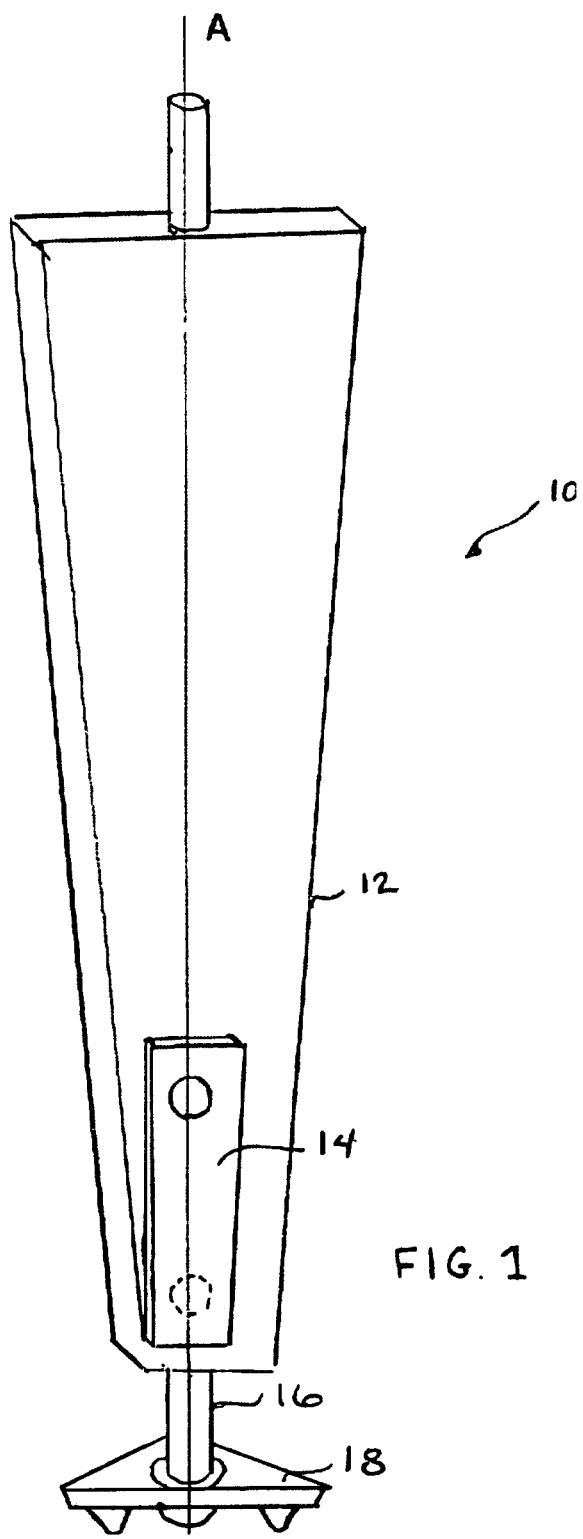
FIG. 1 is a perspective view of visible line marking system in accordance with an illustrative embodiment of the present invention.

With initial reference to FIG. 1, there is shown an illustrative embodiment of the present invention indicated generally generally at 10, and including a movable structure 12 upon which is mounted a laser projection module 14. Movable structure 12 includes a vertically extending pole 16 coupled to a ground engage base 18. FIGS. 2 and 3 depict various orientations of system 10, with FIG. 3 depicting a portion of an optical fiber which, in accordance with one embodiment of the present invention, feeds optical energy from a remotely located laser source (not shown) to laser projection module 14.

Figure 4:
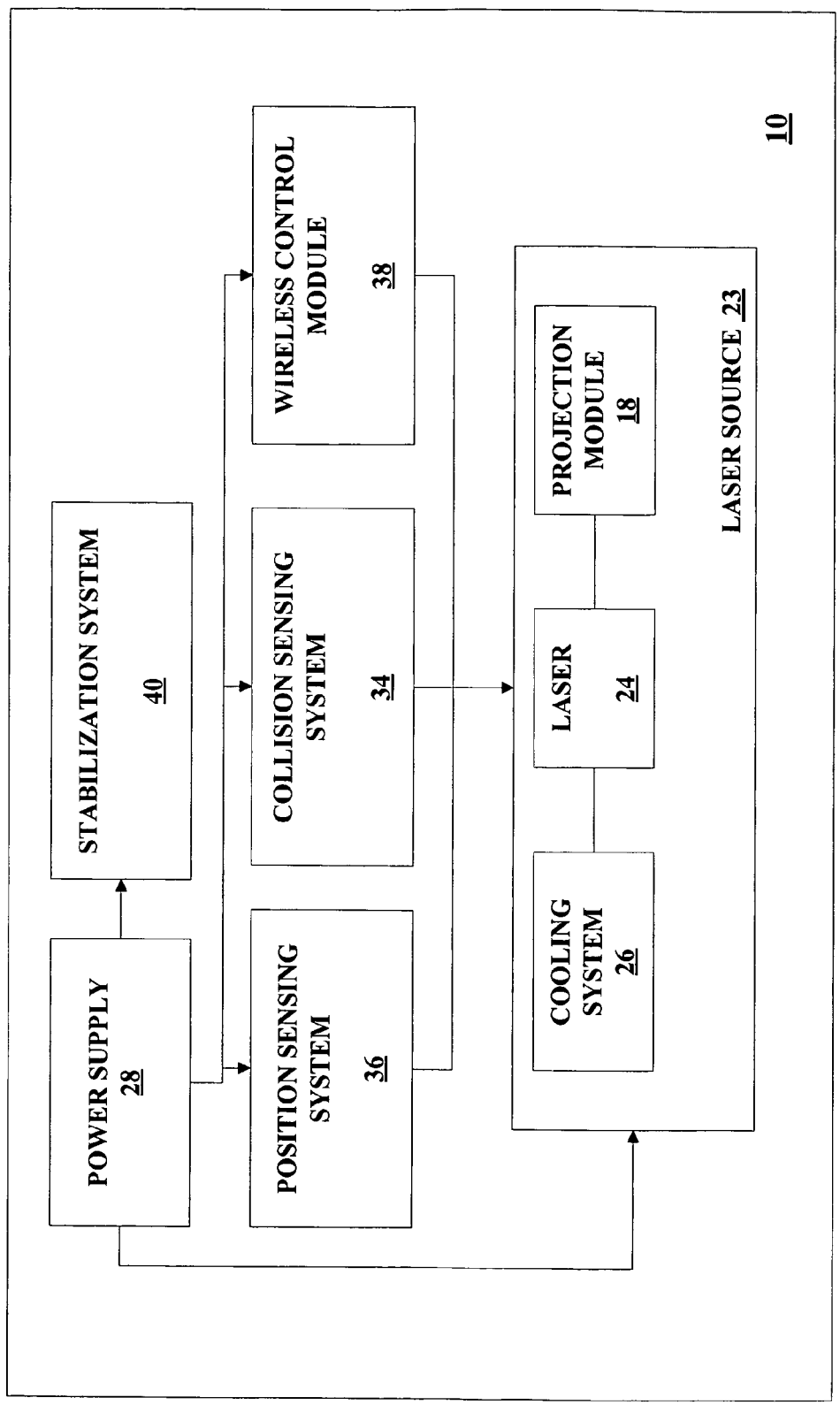
FIG. 4 is a block diagram depicting the various functional elements of the exemplary visible line marking system of FIGS. 1-3.

FIG. 4 is a schematic diagram depicting system 10 in accordance with an illustrative embodiment of the invention. System 10 includes a laser source indicated generally at 23, which includes a laser 24 and a cooling system 26 for maintaining the laser within a temperature range suitable for safe operation. Laser source 23 further includes projection module 18 adapted to receive the optical energy from laser 24 and direct it onto the athletic field (not shown). Power for the laser is provided by a power source indicated generally at 28. In accordance with an illustrative embodiment of the invention, laser 24, cooling system 26, and projection module 18 are all supported by movable structure 22 for collective positioning adjacent to the surface upon which a visible line is to be temporarily projected. In accordance with an alternate embodiment, only the projection module is supported by movable structure 22, while power and optical energy output by the laser are generated remotely and supplied via an electrical cable and a optical fiber, respectively.

With continuing reference to FIG. 4, it will be seen that system 10 further includes a collision sensing system 34, a position sensing system 36, and a wireless control system 38. Each of these respective systems may independently disable laser source 23 to prevent the misdirection of optical energy away from the athletic field. Collision sensing system 34, for example, is configured to detect when an object (e.g., a moving football player) is close enough to and moving fast enough towards system 10 to suggest that a collision with system 10 is imminent. It is believed that the sensing circuitry and components currently used in connection with vehicle collision avoidance systems may be readily adapted to the aforementioned purpose and that such adaptation is well within the skill of the ordinary artisan. Accordingly, a detailed description of the construction and operation of the same has been omitted for clarity.

Position sensing system 36 is configured to determine when movable structure 22 is no longer being supported at an angular orientation that is within the range for which stabilization system 40 can compensate. Stabilization system 40 is able, for example, to compensate for any movement of projection module 18 that result from wind gusts or the hand of the human operator. Positioning system 36 may utilize one or more elements of stabilization system 40 to dynamically ascertain the angular orientation of projection module 18, or it may be implemented as a completely independent system using conventional sensing elements.

The use of a wireless handheld user interface (not shown) is also contemplated, wherein the laser source can be enabled or disabled by the press of a button. Such an interface allows a further element of safety and also permits the system to be easily turned on and off from a remote location. Of course, an on/off switch can also be incorporated into movable structure 22 if desired.

The height at which projection module 18 is maintained above the athletic field surface by movable structure 22 is preferably between 3 cm and 0.5 m, and the housing containing the projection module may be movable to allow adjustment by the operator. The projector module 18 may utilize a scanning projector and control arrangement of the type disclosed in U.S. Pat. No. 7,219,438 entitled SYSTEM FOR OPERATING ONE OR MORE SUSPENDED LASER PROJECTORS TO PROJECT A TEMPORARY VISIBLE IMAGE ONTO A SURFACE. Closed-loop galvanic scanners (also called "position detecting" scanners), for example, are commonly used in the laser light entertainment industry and are capable of directing a beam to 24,000 to 30,000 discrete points along a selected path every second.

The manner in which laser source 23 is disabled admits of substantial variation. For example, the laser itself can be de-energized in response to an input received from any one of collision system 34, position sensing system 36, and wireless interface 38. Alternatively, projection module 18 may include a conventional shutter mechanism (not shown) such, for example, as an acoustic optical modulator (AOM) for turning off the beam.

For a line width of approximately six inches (15 cm), excellent results have been achieved in a stadium environment (i.e., from distances in excess of several hundred feet) using a 10 W, frequency doubled, Q-switched Nd:YAG laser adapted to generate laser pulses at a wavelength of 532 nm. Emission at this wavelength is especially preferred since it is very close to the peak (555 nm) of the human eye's sensitivity. By comparison, in an argon ion laser operating in continuous wave (cw) mode, roughly half of the output is at 514 nm (58% as bright as the same beam at 555 nm), another 30% is at around 480 nm (18% as bright) and the remaining 20% is at around 440 nm (barely visible to he human eye). Thus, an argon laser would theoretically have to deliver up to three or four times as much power to match the visibility of the Nd:YAG laser.

While given components of the system have been described separately, one of ordinary skill also will appreciate that some of the functions may be combined or shared in given instructions, program sequences, code portions, and the like. The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for providing a temporary visible reference line across a surface, comprising:
    a movable structure dimensioned and arranged to be supported by and project upwardly from an athletic field surface;
    a laser source supported by the movable structure, the laser source being positionable at an elevated location relative to the athletic field surface and operative to direct optical energy at a wavelength of between 380 nm and 750 nm upon the athletic field surface while said movable structure is maintained substantially in a first orientation relative to the athletic field surface;
    a position sensing system operative to determine when said movable structure is no longer maintained substantially in the first orientation;
    a safety switch operative to disable the laser source when said movable structure is no longer maintained substantially in the first orientation; and
    a collision detection system adapted to sense an impending collision with a rapidly approaching player, said safety switch being responsive to the collision detection system to disable to the laser source before such collision occurs.

2. The apparatus according to claim 1, further comprising at least one laser remotely located from and optically coupled to said laser source, wherein the laser source includes a projection module disposed within a housing securable to the movable structure.

3. The apparatus according to claim 2, wherein one of the laser and the projection module is operative to produce a continuous output for period no greater than 0.25 seconds, to thereby produce a sequence of pulses suitable compliant with a Class 1 mode of operation.

4. The apparatus according to claim 1, wherein the laser source includes a single laser disposed within a housing secured to the movable structure.

5. The apparatus according to claim 4, wherein said apparatus further including a cooling system for maintaining the laser at a safe operating temperature during use.

6. The apparatus according to claim 4, wherein the laser source is rated at from 5 to 10 W.

7. The apparatus according to claim 1, further including one of an active and a passive stabilization system.

8. An apparatus for providing a temporary visible reference line across a surface, comprising:

a movable structure dimensioned and arranged to be supported by and project upwardly from an athletic field surface;

a laser source supported by the movable structure, the laser source being positionable at an elevated location relative to the athletic field surface and operative to direct optical energy at a wavelength of between 380 nm and 750 nm upon the athletic field surface while said movable structure is maintained substantially in a first orientation relative to the athletic field surface;

a collision detection system adapted to sense an impending collision with a rapidly approaching player; and a safety switch being responsive to the collision detection system to disable the laser source before such collision occurs.

9. The apparatus according to claim 8, further comprising at least one laser remotely located from and optically coupled to said laser source, wherein the laser source includes a projection module disposed within a housing securable to the movable structure.

10. The apparatus according to claim 9, wherein one of the laser and the projection module is operative to produce a continuous output for period no greater than 0.25 seconds, to thereby produce a sequence of pulses suitable compliant with a Class 1 mode of operation.

11. The apparatus according to claim 8, wherein the laser source includes a single laser disposed within a housing secured to the movable structure.

12. The apparatus according to claim 11, wherein said apparatus further including a cooling system for maintaining the laser at a safe operating temperature during use.

13. The apparatus according to claim 8, further including an on/off switch dimensioned and arranged to selectively enable and disable the laser source.

* * * * *